United States Patent Office.

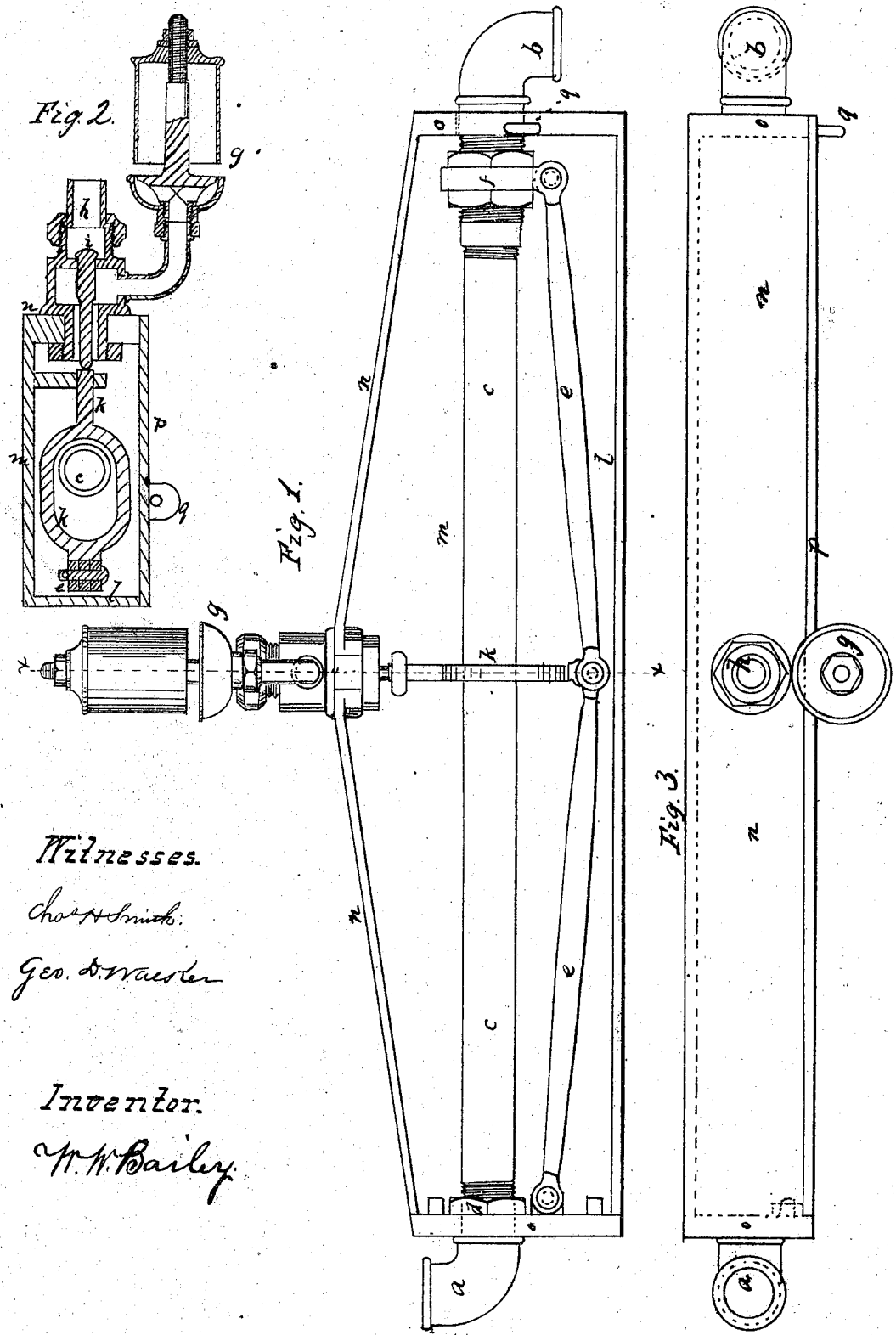

WILLIAM W. BAILEY, OF NEW YORK, N. Y.

Letters Patent No. 75,618, dated March 17, 1868.

IMPROVEMENT IN LOW-WATER DETECTORS FOR STEAM-GENERATORS.

*The Schedule referred to in these Letters Patent and making part of the same.*

TO ALL WHOM IT MAY CONCERN:

Be it known that I, WILLIAM W. BAILEY, of the city and State of New York, have invented and made a certain new and useful Improvement in Low-Water Indicators for Steam-Boilers; and I do hereby declare the following to be a full, clear, and exact description of the said invention, reference being made to the annexed drawing, making part of this specification, wherein—

Figure 1 is an elevation of the said indicator with the cover removed.

Figure 2 is a vertical section at the line $x\,x$; and

Figure 3 is a plan of said indicator.

Similar marks of reference denote the same parts.

This invention consists in a metallic tube, placed near the level of the low-water line, in combination with a tension-valve opener, formed with a bend or angle near its centre, in order that the expansion of the said tube, as it fills with steam, shall by said tension-valve opener communicate an increased motion to the valve which gives the alarm. By this construction the complicated and costly apparatus heretofore employed to open a valve by a compression endwise of a spring is dispensed with, and the risk of the parts becoming inoperative is avoided. I also enclose the low-water indicator in a case with a movable cover, to be locked or sealed up, so as to entirely prevent the apparatus being rendered inoperative, either accidentally or by design, thus preventing the risks that exist with other low-water indicators that they will be tampered with to evade the legal enactments and regulations concerning steam-boilers.

In the drawing, $a$ is a pipe leading from the steam-space of a boiler to any desired position where the indicator is to be placed, and $b$ is a pipe leading to the lower part of the boiler, and $c$ is the expansion-tube between these pipes $a$ and $b$, and at a level corresponding to the lowest water-level of the boiler, in order that the tube $c$ may be expanded by steam taking the place of water in said tube when the water-level falls below the desired point. These pipes and their action are well known. I sustain one end of the pipe $c$ firmly by the nut and support $d$. The other end is free to move as the pipe expands longitudinally. Near the pipe $c$ and support $d$ I attach one end of my tension-valve opener $e$, and connect the other end with the pipe $c$ by means of the ring $f$ and its adjusting-nuts, so that the tension valve-opener will be drawn more nearly into a straight line by the expansion of the pipe $c$. This tension-valve opener is shown as two bars, jointed in the middle and at their ends. It may, however, be made as a bar, rod, spring, or chain, and be attached at the ends directly to the pipe, without being adjustable, the adjustment being at the valve itself. The steam-whistle $g$ is made in any usual manner. $h$ is the pipe supplying steam to the same, and $i$ is the valve, and $k$ the stem to the tension valve-opener $e$. This stem $k$ may be formed in any desired manner. I have, however, shown the same as a flattened ring at the part where the pipe $c$ passes, so as to allow of the motion given to the stem and valve by the expansion of the tube $c$ and the straightening of the opener $e$ giving a large movement with a small extent of expansion. The alarm may be of any desired character, but a steam-whistle is preferred. The case enclosing the alarm is made with the bottom, $l$, back $m$, top $n$, and ends $o\,o$, and $p$ is a movable cover or door, to give access to the parts, and $q$ is a staple, to which a lock is to be applied, or a seal, or other reliable fastening, whereby the low-water detector, after having been inspected, can be secured from being injured, disconnected, or otherwise tampered with, either through ignorance, accident, or design.

What I claim, and desire to secure by Letters Patent, is—

1. The tension-valve opener, in combination with an expansive tube, fitted and operating substantially as and for the purposes set forth.

2. The combination of an expansive tube with the tension-valve opener and alarm-whistle, substantially as set forth.

Dated January 21, 1868.

W. W. BAILEY.

Witnesses:
CHAS. H. SMITH,
GEO. D. WALKER.